UNITED STATES PATENT OFFICE.

JOHN W. BLOCK, OF JOLIET, ILLINOIS.

COAGULANT FOR FILTERING.

1,173,698.

Specification of Letters Patent. Patented Feb. 29, 1916.

No Drawing. Application filed June 27, 1914. Serial No. 847,788.

*To all whom it may concern:*

Be it known that I, JOHN W. BLOCK, a citizen of the United States, residing at Joliet, in the county of Will and State of Illinois, have invented certain new and useful Improvements in Coagulants for Filtering, of which the following is a specification.

The object of my invention is to increase the efficiency of water supply sedimentation, or sedimentation and filtration, by the use of an improved coagulant, which coagulant diminishes the time necessary for sedimentation, increases the efficiency, and decreases the cost of the filtering operation as a whole.

My improvement is applied to the well-known water purifying operation in which the raw water is first treated with some coagulant, such as alum, aluminum sulfate, or feric sulfate, settled in sedimentation basins and, in most instances, subsequently filtered through a suitable filter bed. The action of the coagulants mentioned is similar. When aluminum sulfate is used the hydroxid separates from the aluminum sulfate or other coagulant used, such separation arising either from the dissociation caused by the extreme dilution of the aluminum sulfate when added to the water being treated, or by alkalis contained therein, and the coagulation is effected by the colloidal hydroxid so precipitated.

According to my invention I intermix with the aluminum sulfate, or other similar substance used as a coagulant, an agent which has the effect of facilitating the precipitation of the coagulant, and the further effect of diminishing the time necessary for sedimentation of the coagulant, increasing the efficiency with which the coagulant acts, while at the same time reducing the amount of coagulant necessary to produce equal and better results than are obtained without the use of the mixture which constitutes my invention.

I have found that when a small amount of titanium sulfate, sodium titanate, or other suitable soluble compound of titanium, is used in conjunction with aluminum sulfate, the time of sedimentation is materially reduced, generally requiring about one-third or less time than is necessary when aluminum sulfate alone is used. In practice I have found that if an amount of titanium sulfate, sodium titanate, or other suitable titanium compound be used in an amount equal to about one-half of one per cent. of the aluminum sulfate, complete sedimentation may be obtained, as above stated, in about one-third the time necessary when aluminum sulfate alone is used.

The titanium compound may be mixed with the aluminum sulfate in any convenient manner, such as preparing a solution of aluminum sulfate and the titanium compound and using the same in the manner in which the aluminum sulfate solution, or other coagulant, is now used.

Not only is the time of sedimentation reduced by the use of my improved coagulant, but superior results are obtained by the use of much smaller quantities of my improved coagulant than are necessary when aluminum sulfate, or others of the coagulants now used, are relied upon. This is especially noticeable in the color tests which show in many instances a lower color index when much smaller quantities of my improved coagulant are used in experiments conducted under the same conditions as other experiments with much larger quantities of aluminum sulfate or others of the old coagulants.

The high efficiency of my improved coagulant as compared with those now in use is a matter possibly not susceptible of precise explanation. It appears, however, that the precipitation of titanium oxid, which takes place when the solution of that compound becomes diluted in the water under treatment, induces a more rapid and more finely divided precipitation of the aluminum hydroxid, and that the particles of titanium droxid, and that the particles of titanium oxid in some manner serve to keep the aluminum hydroxid in a more distributed condition than when the aluminum hydroxid is precipitated in the absence of the titanium compound. Whatever may be the true explanation of the phenomenon, I have found that the use of the titanium compound leads to the advantageous results above referred to.

It will be obvious that so far as my invention is concerned the titanium compound may be mixed with the coagulant in a variety of ways and either before or after the coagulant is made into a solution ready for addition to the water to be treated.

Sulfate of alumina is commonly manufactured from bauxite, which, in addition to alumina, contains titanium oxid to the extent of about one-half to three per cent., but in treating bauxite with sulfuric acid for the purpose of preparing aluminum sulfate the acid is never used to a higher degree than from 45° to 46° Baumé, and the majority of manufacturers prefer to use acid in a more diluted state, preferably about 18° Baumé. At such dilutions the sulfuric acid does not dissolve any titanium oxid whatever, and it is the universal practice to use sulfuric acid of the high dilution stated above, for the reason that with more concentrated acid the mass becomes thick and the action ceases. The aluminum sulphate containing a proportion of titanium sulfate suitable for purposes of my invention may, however, be prepared by preparing a mixture of bauxite and sulfuric acid, preferably more concentrated than now used, and subjecting the mixture to heat, thus driving off the water and generating acid vapors to act upon the titanium oxid. The particular method of obtaining titanium sulfate, or other insoluble titanium compound, is a matter to be determined by conditions of economy, and, as above stated, my invention is not limited to the particular means adopted for getting the necessary amount of titanium in the solution.

It will be obvious that my invention is not confined to the use of a titanium compound with aluminum sulfate, although for convenience I have referred principally to aluminum sulfate in my foregoing explanation of my invention.

I claim:—

1. In a process of the kind described, the addition of a coagulant to the water and the addition thereto of a soluble compound of titanium.

2. In a process of the kind described, the addition of a coagulant to the water, and the addition thereto of titanium sulfate.

3. In a process of the kind described, the addition of aluminum sulfate to the water, and the addition thereto of a soluble compound of titanium.

4. In a process of the kind described, the addition of aluminum sulfate to the water, and the addition thereto of titanium sulfate.

In testimony whereof, I have subscribed my name.

JOHN W. BLOCK.

Witnesses:
ANNA BLOCK,
LOUIS LAGGER.